(12) United States Patent
Watanabe et al.

(10) Patent No.: US 9,071,090 B2
(45) Date of Patent: Jun. 30, 2015

(54) MOTOR AND ELECTRIC DEVICE INCLUDING THE SAME

(75) Inventors: Akihiko Watanabe, Osaka (JP); Tatsuo Maetani, Hyogo (JP); Yoshinori Isomura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 245 days.

(21) Appl. No.: 13/505,200

(22) PCT Filed: Feb. 2, 2012

(86) PCT No.: PCT/JP2012/000699
§ 371 (c)(1),
(2), (4) Date: Apr. 30, 2012

(87) PCT Pub. No.: WO2012/147244
PCT Pub. Date: Nov. 1, 2012

(65) Prior Publication Data
US 2012/0274157 A1    Nov. 1, 2012

(30) Foreign Application Priority Data

Apr. 27, 2011 (JP) ................... 2011-099166
Aug. 31, 2011 (JP) ................... 2011-188902
Sep. 9, 2011 (JP) ................... 2011-196823

(51) Int. Cl.
*H02K 1/06* (2006.01)
*H02K 7/08* (2006.01)
*H02K 5/173* (2006.01)
*H02K 11/00* (2006.01)

(52) U.S. Cl.
CPC .............. *H02K 7/083* (2013.01); *H02K 5/1732* (2013.01); *H02K 11/0089* (2013.01)

(58) Field of Classification Search
CPC .................................................. H02K 11/0089
USPC .................................. 310/68 R, 69, 72, 90, 91
See application file for complete search history.

(56) References Cited

U.S. PATENT DOCUMENTS

| | | | |
|---|---|---|---|
| 7,456,533 B2 * | 11/2008 | Nanbu et al. | 310/71 |
| 7,497,131 B2 * | 3/2009 | Sentoku | 73/862.322 |
| 7,521,827 B2 * | 4/2009 | Orlowski et al. | 310/68 R |
| 2004/0189115 A1 * | 9/2004 | Preisinger et al. | 310/68 R |
| 2006/0186746 A1 * | 8/2006 | Nanbu et al. | 310/68 R |
| 2010/0253158 A1 * | 10/2010 | Mizukami et al. | 310/43 |
| 2011/0043071 A1 * | 2/2011 | Mizukami et al. | 310/216.121 |

(Continued)

FOREIGN PATENT DOCUMENTS

| | | |
|---|---|---|
| JP | 2004-229429 A | 8/2004 |
| JP | 2007-159302 A | 6/2007 |
| WO | WO 2009/113311 A1 | 9/2009 |

(Continued)

*Primary Examiner* — Naishadh Desai
(74) *Attorney, Agent, or Firm* — Brinks Gilson & Lione

(57) ABSTRACT

A motor includes a stator having a stator iron core wound with stator windings, a rotor rotatably mounted on a shaft, a bearing for supporting the shaft, and a conductive bracket for fixing the bearing. The rotor is formed of a rotary body that holds a permanent magnet and the shaft that extends through the rotary body at center and joined to the rotary body. An electrostatic capacity between the shaft and an outermost wall of the rotary body is set smaller than an electrostatic capacity between an inner ring and an outer ring of the bearing during rotation of the bearing.

12 Claims, 14 Drawing Sheets

(56) References Cited

U.S. PATENT DOCUMENTS

2011/0234026 A1* 9/2011 Mizukami et al. .............. 310/43
2012/0112588 A1 5/2012 Watanabe et al.

FOREIGN PATENT DOCUMENTS

| WO | WO 2009113311 A1 | * | 9/2009 |
| WO | WO 2011/030536 A1 | | 3/2011 |

* cited by examiner

Fig.11

|  | Sample 1 | Sample 2 | Sample 3 | Sample 4 | Sample 5 | Sample 6 | Sample 7 | Sample 8 | Sample 9 |
|---|---|---|---|---|---|---|---|---|---|
| Rotary-body electrostatic capacity Cr (pF) | 0.5 | 1 | 5 | 10 | 30 | 50 | 100 | 150 | 1013 |
| Capacity ratio Rc | 1/100 | 1/50 | 1/10 | 1/5 | 3/5 | 1/1 | 2/1 | 3/1 | 2026/100 |
| Shaft voltage (V) | 2.1 | 3.9 | 5.2 | 6.8 | 9.3 | 14.2 | 17.4 | 20.3 | 58.9 |
| Waveform collapse of shaft voltage | None | None | None | None | Partial | Partial | Complete | Complete | Complete |
| Induction voltage (V) | 123 | 129 | 130 | 129 | 130 | 130 | 130 | 130 | 130 |
| Noise after the endurance test (dB) | 29 | 29 | 29 | 30 | 36 | 35 | 41 | 43 | 48 |

MOTOR AND ELECTRIC DEVICE INCLUDING THE SAME

This application is a 371 application of PCT/JP2012/000699 having an international filing date of Feb. 2, 2012, which claims priority to JP2011-099166 filed Apr. 27, 2011, JP2011-188902 filed Aug. 31, 2011 and JP2011-196823 filed Sep. 9, 2011, the entire contents of which are incorporated herein by reference.

TECHNICAL FIELD

The present invention relates to a motor, more particularly, a motor of which bearing is improved such that an occurrence of electric erosion is suppressed.

BACKGROUND ART

In recent years an inverter employing a pulse width modulation method (hereinafter referred to simply as "PWM method") has been widely used for driving motors. An inverter-driving with the PWM method encounters an electric potential difference (hereinafter referred to simply as "shaft voltage") between an outer ring and an inner ring of the bearing because the electric potential at a neutral point of the winding does not stay at 0 (zero). The shaft voltage contains high-frequency component produced by switching action, and when the shaft voltage reaches a breakdown voltage of oil film formed inside the bearing, micro-electric current runs inside the bearing, thereby producing electric erosion inside the bearing. A progress of the electric erosion will encounter wavy-abrasion on the outer ring, inner ring, or balls of the bearing, and resultantly produces an abnormal sound that is one of chief causes of malfunctions of motors.

A power supply circuit of a driving circuit (including a control circuit) for inverter-driving the foregoing motor with the PWM method is electrically insulated from a primary side circuit of the power supply circuit, and from a grounding to the earth of the primary side circuit.

To suppress the electric erosion, the following measures have been taken: (1) The inner ring and the outer ring of the bearing are put in a conductive state. (2) The inner ring and the outer ring of the bearing are put in an insulated state. (3) The shaft voltage is lowered.

To be more specific about item (1), conductive lubricant is used for the bearing. However, the conductive lubricant has such drawbacks as its conductivity lowers with the passage of time, and sliding reliability is insufficient. There is another method to generate the conductive state, i.e. a rotary shaft is provided with a brush. This method has also problems such as abrasion powders are produced, and a space for the brush is needed.

To be more specific about item (2), iron balls disposed inside the bearing are replaced with non-conductive ceramic balls. Although this method can suppress substantially the electric erosion, it costs a lot, so that this method cannot be employed for generalized motors.

To be more specific about item (3), a stator iron core is electrically shorted with a metal conductive bracket for changing an electrostatic capacity, thereby lowering the shaft voltage. This method has been known to the public (e.g. refer to Patent Literature 1). There are many other methods, e.g. the stator iron of a motor is grounded (e.g. refer to Patent Literature 2), for suppressing the electric erosion of the motor bearing.

In recent years, a highly reliable mold-motor has been proposed. This mold-motor employs stator members, such as a stator iron core, which are molded by using moldable materials. In this motor, the bearing is rigidly mounted with the forgoing insulating molded members replacing metal brackets for reducing a needless high-frequency electric voltage that is produced on the outer ring side of the bearing, or for reducing a needless high-frequency electric current flowing between the outer ring and the inner ring of the bearing. However, these molded members are made of resin and have strength not enough to rigidly mount the bearing to the motor, or have dimensional accuracy not accurate enough due to molding the resin. These drawbacks tend to encounter a creep failure in the bearing. In other words, the bearing like a ball bearing, in general, has a space between its outer ring and an inner wall of the housing, in this case, transmission load produces force on the shaft in radial direction, and this force tends to produce a slipping phenomenon due to relative difference in the radial direction. This slipping phenomenon is referred to as creep, which can be usually restrained by fixing the outer ring strongly to the housing, e.g. bracket. In recent years, the motor capable of outputting a greater power has prevailed, so that the bearing needs to be fixed to the housing more strongly. This market trend inevitably entails to take measures against the creep by employing a metal bracket for fixing the bearing. This metal bracket is made of stainless steel plate and excellent in dimensional accuracy. The rotary shaft is usually supported by the bearings at two places, so that it is preferable to fix the two bearings with metal brackets because of the strength described hereinbefore and easiness of implementation.

A motor, of which rotor is provided with a dielectric layer between the shaft and the outer wall of a rotary body, is disclosed (e.g. refer to Patent Literature 3). The structure of this motor allows suppressing the electric erosion in the bearing.

Several methods have been proposed hereinbefore, but yet those conventional methods encounter the following problems:

The method disclosed in Patent Literature 1: Since this method employs a short-circuit, the voltage balance between the outer ring and the inner ring of the bearing tends to get out of balance, and the shaft voltage thus sometimes increases.

Another conventional method is this: A power supply circuit of the driving circuit (including a control circuit) for inverter-driving a motor with the PWM method is electrically insulated from a primary side circuit of the power supply circuit, and from a grounding to the earth of the primary side circuit. This structure allows excluding an electric shock, so that safety can be assured. As Patent Literature 2 discloses, a stator iron core of a motor is electrically grounded, and this structure is combined with the foregoing structure in order to suppress the electric erosion. However, this combined structure has another problem from the viewpoint of specification and characteristics of the motor, so that implementation of this combined structure is difficult.

Patent Literature 1: Unexamined Japanese Patent Application Publication No. 2007-159302
Patent Literature 2: Unexamined Japanese Patent Application Publication No. 2004-229429
Patent Literature 3: International Publication No. 2009/113311

DISCLOSURE OF THE INVENTION

A motor of the present invention comprises the following structural elements:
a stator including a stator iron core wound with stator windings;

a rotor disposed rotatably on a shaft;
a bearing for supporting the shaft; and
a conductive bracket for fixing the bearing.

The rotor includes a rotary body holding a permanent magnet and the shaft extending through the rotary body at the center so that the shaft can be joined to the rotary body. An electrostatic capacity between the shaft and the outer wall of the rotary body is set smaller than an electrostatic capacity between an inner ring and an outer ring of the bearing during the rotation of the bearing.

This structure allows regulating the shaft voltage effectively and free from being affected by an operating environment. To be more specific, during the rotation the bearing generates lubricant effect with grease available inside the bearing, whereby an electrostatic capacity is generated between the inner ring and the balls as well as between the outer ring and the balls, and the shaft voltage is resultantly produced. An electrostatic capacity smaller than the foregoing capacity is provided to the rotary body, whereby the shaft voltage can be regulated more effectively by partial voltage effect than it has been regulated by the conventional methods.

An electric device of the present invention employs the foregoing motor.

The present invention thus can provide a motor that can suppress the electric erosion in the bearing effectively, and also can provide an electric device including the same motor.

BRIEF DESCRIPTION OF THE DRAWINGS

FIG. 11 shows measuring results in the first embodiment of the present invention.

DETAILED DESCRIPTION OF THE PREFERRED EMBODIMENTS

A motor and an electric device equipped with the same motor are demonstrated hereinafter with reference to the accompanying drawings.

Embodiment 1

Figure 1:
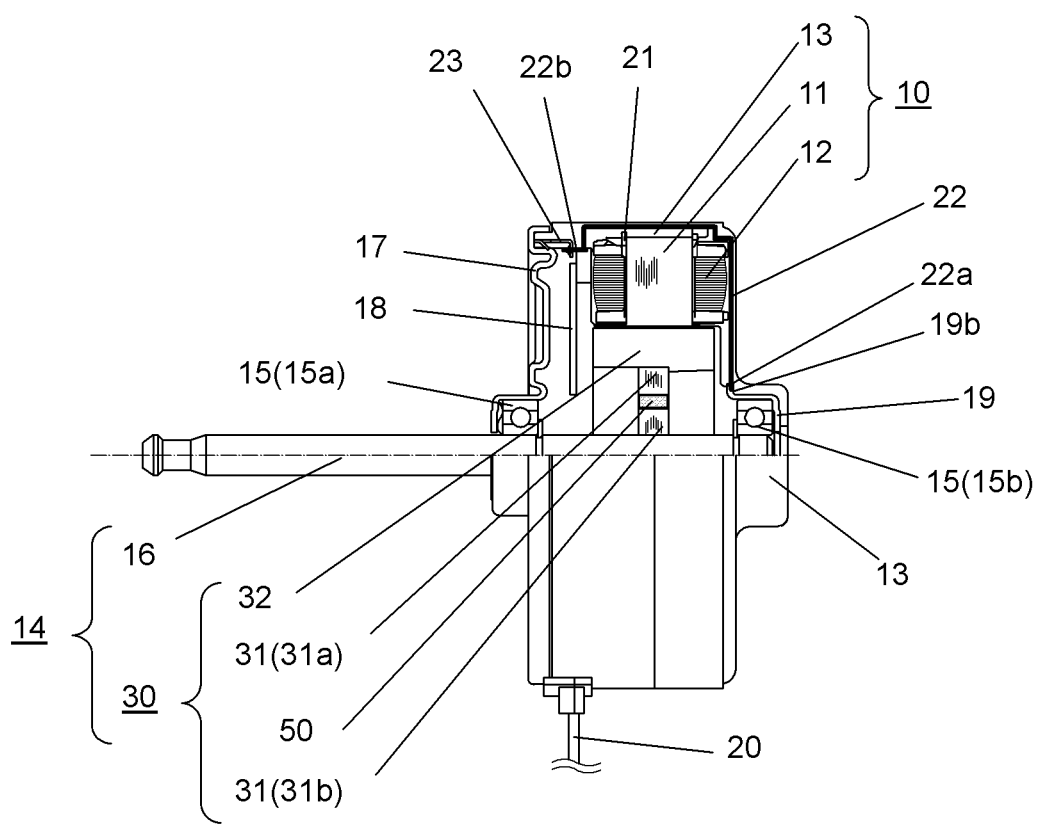
FIG. 1 is a sectional view illustrating a structure of a motor in accordance with a first embodiment of the present invention.

FIG. 1 is a sectional view of a motor in accordance with the first embodiment of the present invention. The motor is mounted to an air-conditioner as a representative of electric devices, and this motor is a brushless motor for driving a blower fan. The motor is an inner-rotor type motor that includes a rotor disposed rotatably inside a stator.

In FIG. 1, stator winding 12 is wound on stator iron core 11 via resin 21 working as an insulator to iron core 11 that is molded by insulating resin 13, working as a mold material, together with other stationary members. In this embodiment, insulating resin 13 employs a molding material of unsaturated polyester resin. In this embodiment, those members are molded into one unit as discussed above, so that stator 10, of which appearance shows generally a cylindrical shape, is formed.

Rotor 14 is inserted inside stator 10 via a space in between, and includes rotary body 30 having rotor iron core 31 and shaft 16 extending through disc-shaped rotary body 30 at the center such that shaft 16 is joined to rotary body 30. Rotary body 30 holds ferrite resin magnet 32 as a permanent magnet in circumferential direction and confronting the inner wall of stator 10. It is though detailed later, rotary body 30 is structured this way: as shown in FIG. 1, outer iron core 31a forming an outer section of rotor iron core 31, dielectric layer 50, and inner iron core 31b forming an inner section of rotor iron core 31 are disposed in this order from ferrite resin magnet 32 located on the outer wall toward shaft 16 located at the inner circumference. FIG. 1 shows an example where rotor iron core 31, dielectric layer 50 and ferrite resin magnet 32 are integrally molded into rotary body 30, namely, an inner wall of stator 10 confronts an outer wall of rotary body 30.

Shaft 16 of rotor 14 is supported by two bearings 15 that are mounted to shaft 16. Each of bearings 15 is a ball bearing having multiple iron balls and shaped like a cylinder, and is fixed to shaft 16 at the inner ring side. In FIG. 1, shaft 16 projects from the main body of the brushless motor to an output shaft side at which bearing 15a supports shaft 16, and at the opposite side (counter side to the output shaft side) bearing 15b supports shaft 16. These bearings 15 are fixed by conductive metal brackets at respective outer ring sides. In FIG. 1, bearing 15a at the output shaft side is fixed by bracket 17, and bearing 15b at the opposite side is fixed by bracket 19. Shaft 16 is thus supported by two bearings 15 so that rotor 14 can rotate.

On top of that, the foregoing brushless motor includes a built-in printed circuit board 18 to which a driving circuit including a control circuit is mounted. Printed circuit board 18 is integrated into the motor, and then bracket 17 is press-fitted into stator 10, whereby the brushless motor is completed. Printed circuit board 18 is connected with connecting wires 20 including lead-wires through which power-supply voltage Vdc for the windings, power supply voltage Vcc for the control circuit, and control voltage Vsp for controlling an rpm are applied, and grounding wires of the control circuit.

A zero potential point on printed circuit board 18, to which the driving circuit is mounted, is insulated from the grounding to the earth and the primary side (power supply) circuit, so that the zero potential point is floated from the potential of the grounding to the earth and from the primary side power supply circuit. The zero potential point refers to a wiring at 0

(zero) volt as a reference potential on printed circuit board 18, and this wiring is a grounding wiring that is usually called "grounding". The grounding wire included in connecting wires 20 is connected to this zero potential point, i.e. the grounding wiring. The power supply circuit for supplying a power supply voltage to the windings, the power supply circuit for supplying a power supply voltage to the control circuit, the lead wire through which the control voltage is applied, and the grounding wire of the control circuit are connected to printed circuit board 18, to which the driving circuit is mounted, and they are electrically insulated from any of the primary side (power supply) circuit with respect to the power supply circuit for supplying the power supply voltage to the windings, another primary side (power supply) circuit with respect to the power supply circuit for supplying the power supply voltage to the control circuit, the grounding to the earth connected to those primary side (power supply) circuits, and an independent grounding to the earth. In other words, the driving circuit mounted to printed circuit board 18 is electrically insulated from the potential of the primary side (power supply) circuit and the potential of the grounding to the earth, so that the electric potential of the driving circuit is floated, which is a well-known expression. The structure of the power supply circuits supplies the power supply voltage to the windings and also supplies the power supply voltage to the control circuit, both of the power supply circuits are connected to printed circuit board 18. This structure is thus called a floating power supply, which is also a well-known expression.

Respective power supply voltages and control signals are supplied via connecting wires 20 to the foregoing brushless motor, whereby stator windings 12 are driven by the driving circuit mounted to printed circuit board 18. The drive of stator windings 12 prompts a driving current to flow through stator windings 12, thereby generating a magnetic field from stator iron core 11. The magnetic field from stator iron core 11 and a magnetic field from ferrite resin magnet 32 generate attraction or repulsion depending on the polarities of these magnetic fields. These forces of attraction and repulsion rotate rotor 14 on shaft 16.

The structure of the brushless motor discussed above is detailed hereinafter. Shaft 16 of the brushless motor is supported by two bearings 15, each of which is fixed and supported by a bracket. In order to reduce malfunctions caused by the creep discussed above, conductive metal brackets are used for fixing bearings 15. This embodiment employs conductive brackets 17 and 19 made of stainless steel plate so that they can be excellent in dimensional accuracy. In case of requiring the motor to output greater power, this structure is preferable.

Bearing 15a disposed on the output shaft side is fixed by bracket 17 having an outer diameter approx. equal to the outer diameter of stator 10. Bracket 17 shapes like a disc and has a protrusion at the disc center, and this protrusion is hollow inside and has a diameter approx. equal to the outer diameter of bearing 15a. After printed circuit board 18 is integrated into the motor, the hollow inside of the protrusion of bracket 17 is press-fitted to bearing 15a, and bracket 17 is press-fitted to stator 10 such that a connection terminal provided to the outer circumference of bracket 17 can be mated with a connection terminal of stator 10. The brushless motor is thus completed. The structure discussed above allows simplifying the assemble process, and since bearing 15a is fixed by metal bracket 17 at the outer ring side, malfunctions caused by the creep can be reduced.

Bracket 19 is hooked up with conduction pin 22 in advance. To be more specific, as shown in FIG. 1, conduction pin 22 is connected to flange section 19b of bracket 19 at first end 22a. Pin 22 is disposed inside insulating resin 13, and is integrally molded with insulating resin 13 as bracket 19 is done. Placement of conduction pin 22 inside the motor, namely, inside insulating resin 13, allows preventing pin 22 from being damaged by rust or external force, so that a highly reliable electrical connection is achieved against the operating condition or external stress. Conduction pin 22 is disposed in insulating resin 13 and extends from flange section 19b toward the outer circumferential of the brushless motor, and then runs in parallel with shaft 16 from the outer circumferential of the brushless motor toward the output shaft, and second end 22b of pin 22 is exposed from an end face of insulating resin 13 at the output shaft side. Second end 22b is coupled with conduction pin 23 that is used for electrically connecting conduction pin 22 to bracket 17. In other words, when bracket 17 is press-fitted into stator 10, conduction pin 23 is brought into contact with bracket 17, so that bracket 17 can be kept conductive to pin 23. The structure discussed above allows bracket 17 to be electrically connected to bracket 19 via conduction pin 22. Bracket 17 and bracket 19 are thus electrically connected each other while these two brackets are insulated from stator iron-core 11 by insulating resin 13.

In this embodiment, electrical coupling of bracket 17 and bracket 19 makes those two brackets stay at an equal potential to each other, which resists the high-frequency electric current to flow via shaft 16, so that the shaft voltage can be stable. Electrical insulation between stator iron core 11 and each of the two brackets allows achieving higher impedance from iron core 11 to the outer rings of bearings 15.

Figure 2:
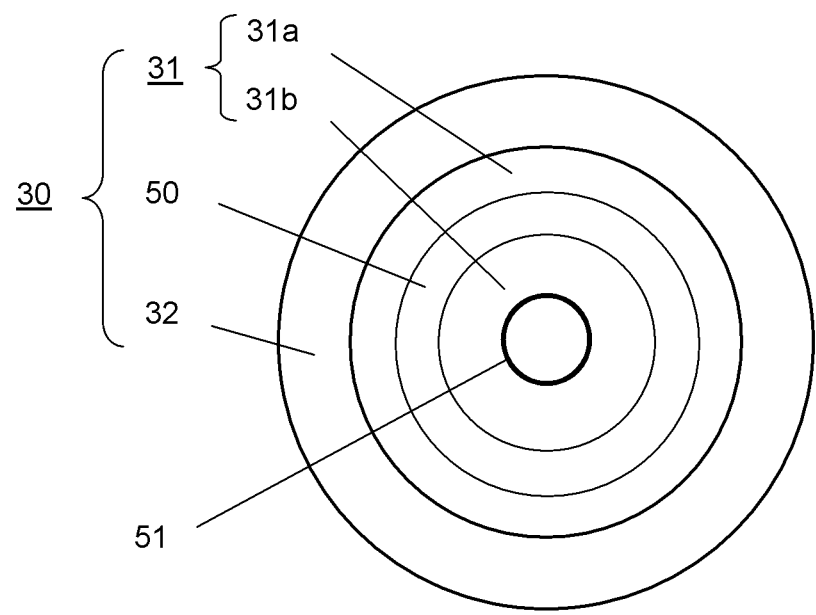
FIG. 2 is a top view of a rotary body of the motor shown in FIG. 1.
Figure 3:
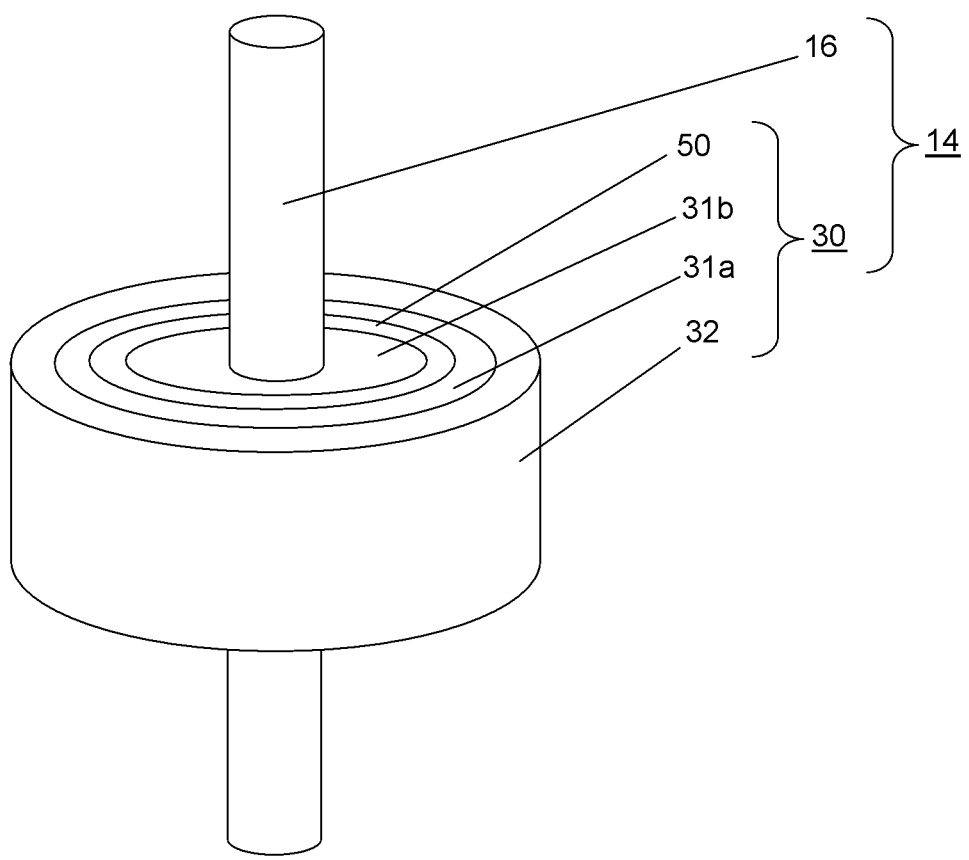
FIG. 3 is a perspective view of a rotor of the same motor.

A structure of rotary body 30 is described hereinafter. FIG. 2 is a top view of rotary body 30 in accordance with this embodiment, and FIG. 3 is a perspective view of rotor 14 including rotary body 30. As shown in FIG. 2, rotary body 30 has ferrite magnet 32 at its outer most periphery, and outer iron core 31a of rotor iron core 31, dielectric layer 50, and inner iron core 31b of rotor iron core 31 are disposed in this order toward the inside. Dielectric layer 50 is made of insulating resin and is disposed in order to suppress the electric erosion. FIG. 2 shows an example of dielectric layer 50, and this example shapes like a ring and exists between the inside and the outside of rotary body 30. This dielectric layer 50 orbits around shaft 16. As discussed above, rotary body 30 is formed by molding ferrite resin magnet 32, outer iron core 31a, dielectric layer 50 made of insulating resin, and inner iron core 31b together into one body. Rotary body 30 is joined to shaft 16 at joint 51 inside inner iron core 31b, whereby rotor 14 supported by bearings 15 is obtained as shown in FIG. 3.

In rotary body 30 discussed above, dielectric layer 50 is a layer formed of insulating resin, so that it isolates outer iron core 31a from inner iron core 31b from a standpoint of direct current. On the other hand, since dielectric layer 50 is formed of the insulating resin having a given dielectric constant, from a standpoint of alternating current, it works as a capacitor having a given electrostatic capacity available between outer iron core 31a and inner iron core 31b. In this embodiment, the presence of the capacitance component in dielectric layer 50 allows achieving higher impedance from stator iron core 11, via rotary body 30 and shaft 16, to the inner ring of bearing 15.

To be more specific, in this embodiment, the impedance from stator iron core 11 to the outer ring of bearing 15 is increased, and the impedance from stator iron core 11 to the inner ring of bearing 15 is also increased, so that a difference in potential (shaft voltage) between the outer ring and the inner ring of bearing 15 can be reduced for suppressing the electric erosion.

Bearing 15 is provided with grease therein, and the grease usually generates lubricant effect during the rotation, thereby producing non-contact micro-space between the inner ring and the balls as well as between the outer ring and the balls. In other words, this micro-space works as an insulating layer between the outer ring and the inner ring of bearing 15 during the rotation, so that a capacitor having a given electrostatic capacity is formed.

In this embodiment, the impedance between the outer ring and the inner ring of the bearing is increased, thereby suppressing the electric erosion. In addition to this suppressing effect, the electrostatic capacity between shaft 16 and the outer wall of rotary body 30 is available, and another electrostatic capacity is available, during the rotation, between the outer ring and the inner ring of the bearing. These two electrostatic capacities are appropriately set, thereby suppressing more effectively the electric erosion occurring in bearing 15.

A detailed description is reserved in a later section, but yet a specific instance is introduced here: Bearing 15 used in this embodiment has an electrostatic capacity of 50 pF between the inner ring and the outer ring when bearing 15 is rotated as a single item at 1000 r/min, and this electrostatic capacity is hereinafter referred to as bearing electrostatic capacity Cb. A width of dielectric layer 50 in the radius direction and the material of layer 50 are so adjusted that the electrostatic capacity (rotary-body electrostatic capacity Cr) between shaft 16 and the outermost wall of rotary body 30 can be, e.g. 5.0 pF, smaller than bearing electrostatic capacity Cb.

The capacity ratio is defined as Rc=Cr/Cb, i.e. a ratio of rotary-body electrostatic capacity Cr to bearing electrostatic capacity Cb, and this embodiment employs capacity ratio Rc not greater than 1/5 from a standpoint of effectiveness of suppressing the electric erosion. The efficiency of the motor is also taken into consideration, so that capacity ratio Rc is set within a range from 1/50 to 1/5 (inclusive).

The foregoing structure of the present invention allows reducing the shaft voltage produced at bearing 15 for suppressing the electric erosion effectively.

Multiple samples are measured for describing the present invention more specifically hereinafter. The present invention is not limited to the structure demonstrated hereinafter, and the following structural instances do not limit the present invention as far as the gist of the invention is not changed.

The multiple samples of rotary body 30 having the structure as shown in FIG. 2 are prepared for verifying the advantage of the present invention. The verification is detailed hereinafter. Dielectric layers 50 of each sample of rotary body 30 employ SPS (syndiotactic polystyrene) resin of which dielectric constant is 2.8. The resin thickness of dielectric layer 50 is adjusted at any value, whereby eight rotors 14 having different rotary-body electrostatic capacities Cr from each other are prepared, where capacity Cr is the electrostatic capacity between shaft 16 and the outermost wall of rotary body 30. To be more specific, each of sample 1-sample 8 of rotor 14 has capacity Cr of 0.5 pF, 1 pF, 5 pF, 10 pF, 30 pF, 50 pF, 100 pF, and 150 pF.

Figure 4:
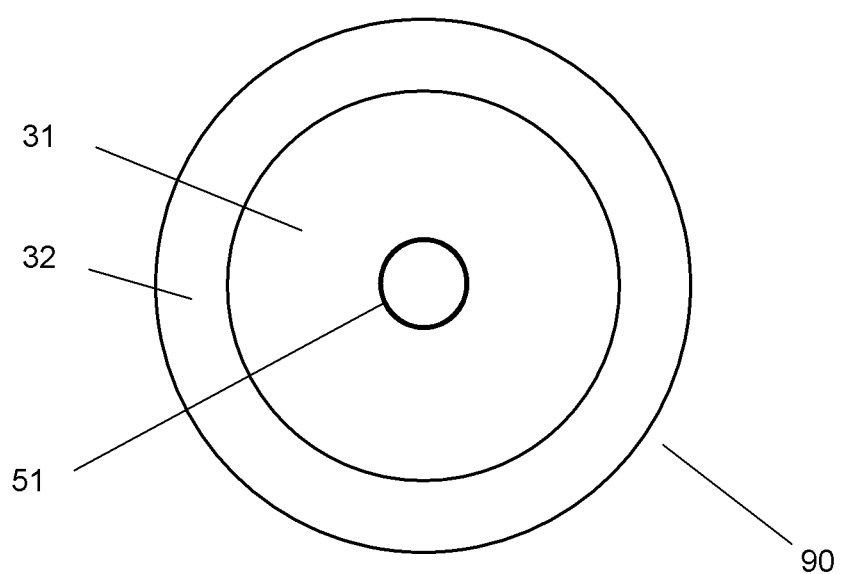
FIG. 4 is a top view of a rotary body having no dielectric layer for a comparison purpose.

On top of that as shown in FIG. 4, rotor 90 having no dielectric layer 50 is prepared as sample 9 for a comparison purpose, and sample 9 is also measured in the same manner as samples 1-8. To be more specific, rotor 94 shown in FIG. 5 and having rotary-body electrostatic capacity Cr of 1013 pF is prepared.

Figure 5:
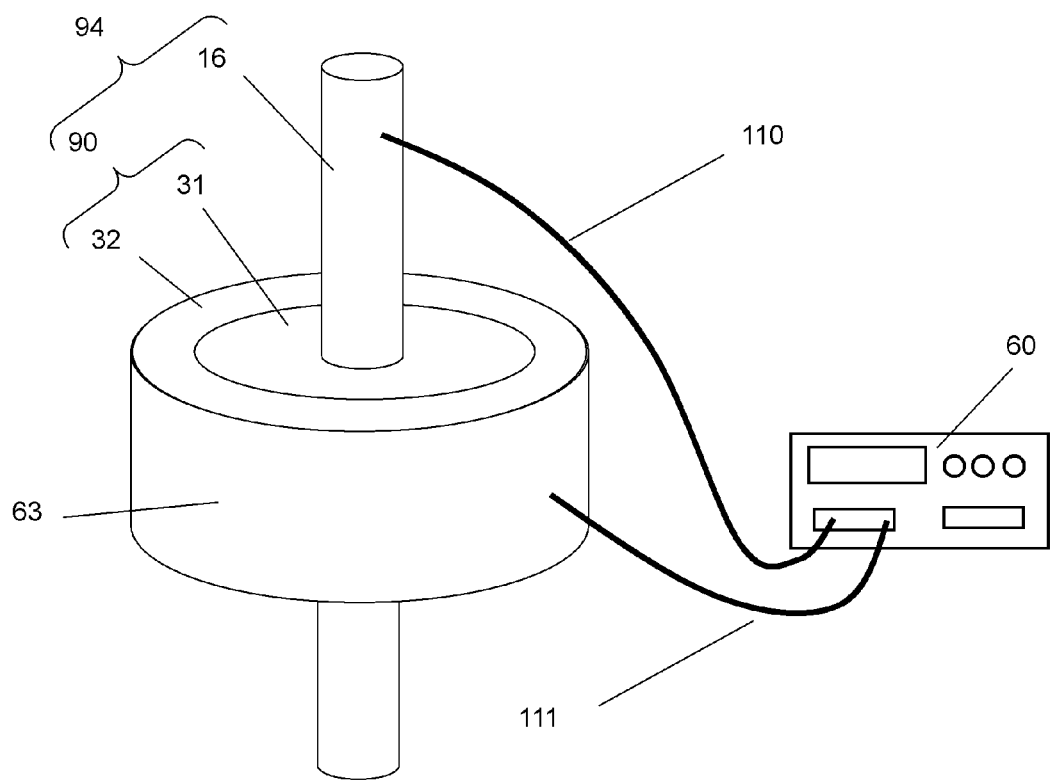
FIG. 5 shows a method of measuring electrostatic capacity Cr of a rotary body.

Rotary-body electrostatic capacity Cr of each of samples 1-9 is measured this way: FIG. 5 shows a method of measuring the capacity Cr, and this method is used for sample 9, i.e. rotor 94. Stick copper foil 63 on the outermost wall of rotary body 90 as shown in FIG. 5, and measure the rotary-body electrostatic capacity Cr between shaft 16 and copper foil 63 with LCR meter 60 under the following condition: measuring frequency=10 kHz, temperature=20° C., voltage=1V, and shaft 16 is fixed to a wood plate having a thickness of 20 mm. The same method and condition are applied to samples 1-8, namely, copper foil 63 is stuck to the outermost wall of rotor 14, and the electrostatic capacity between shaft 16 and copper foil 63 is measured.

Figure 6:
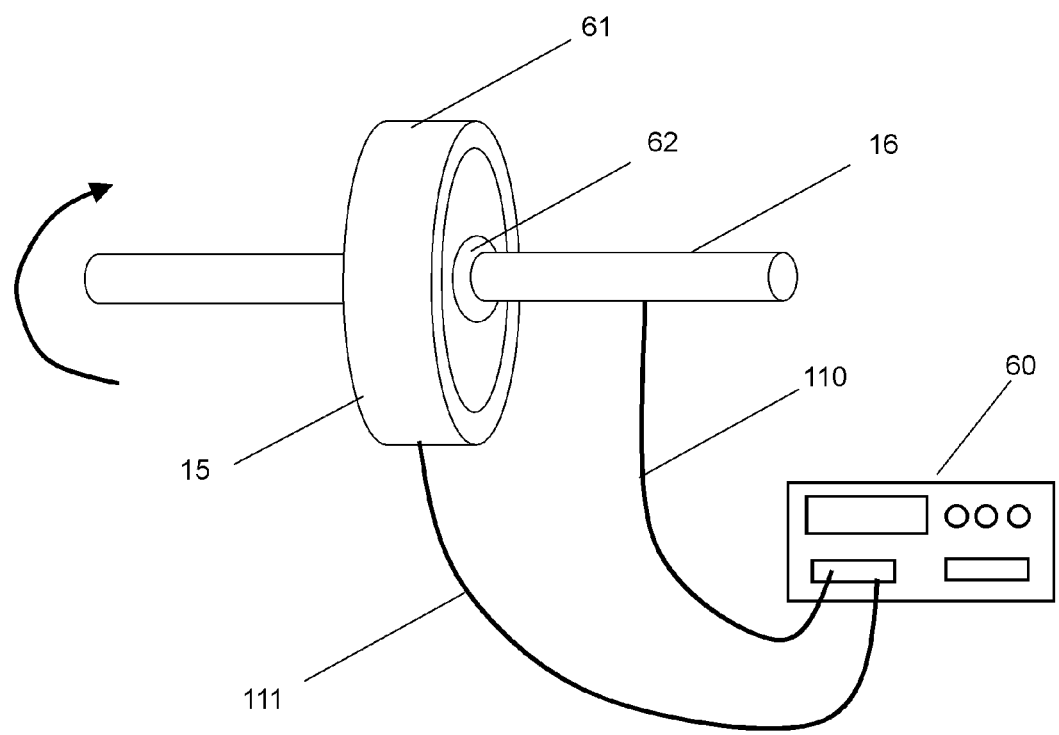
FIG. 6 shows a method of measuring electrostatic capacity Cb of a bearing.

Bearing electrostatic capacity Cb between the outer ring and the inner ring of bearing 15 during the rotation is measured this way: Bearing 15 is made by MINEBEA Co. Ltd., and model No. is 608. Grease having consistency 239 is used. FIG. 6 shows a method of measuring bearing electrostatic capacity Cb of this bearing 15. Bearing 15 is rotated by an external driving device at 1000 r/min, and its capacity Cb is measured with LCR meter 60 under the following condition: measuring frequency=10 kHz, temperature=20° C., voltage=1V. In this condition, the electrostatic capacity between outer ring 61 and shaft 16 that is brought into contact mechanically and electrically with inner ring 62 is measured. During the measuring, a coupling made of insulating resin and having a thickness of at least 20 mm is used between shaft 16 and the external driving device. A pedestal made of insulating resin and having a thickness of at least 20 mm is prepared on a wood plate having a thickness of 20 mm, and the external driving device together with shaft 16 and bearing 15 are disposed on this pedestal. Bearing 15 is rotated as a single item at 1000 r/min, and bearing electrostatic capacity Cb between inner ring 62 and outer ring 61 measures 50 pF.

The respective rotors of samples 1-9 measure their capacity ratios Rc, i.e. the ratio of rotary-body electrostatic capacity Cr to bearing electrostatic capacity Cb, and the shaft voltage, waveform collapse of the shaft voltage, induction voltage, and noises after an endurance test are also measured.

Figure 7:
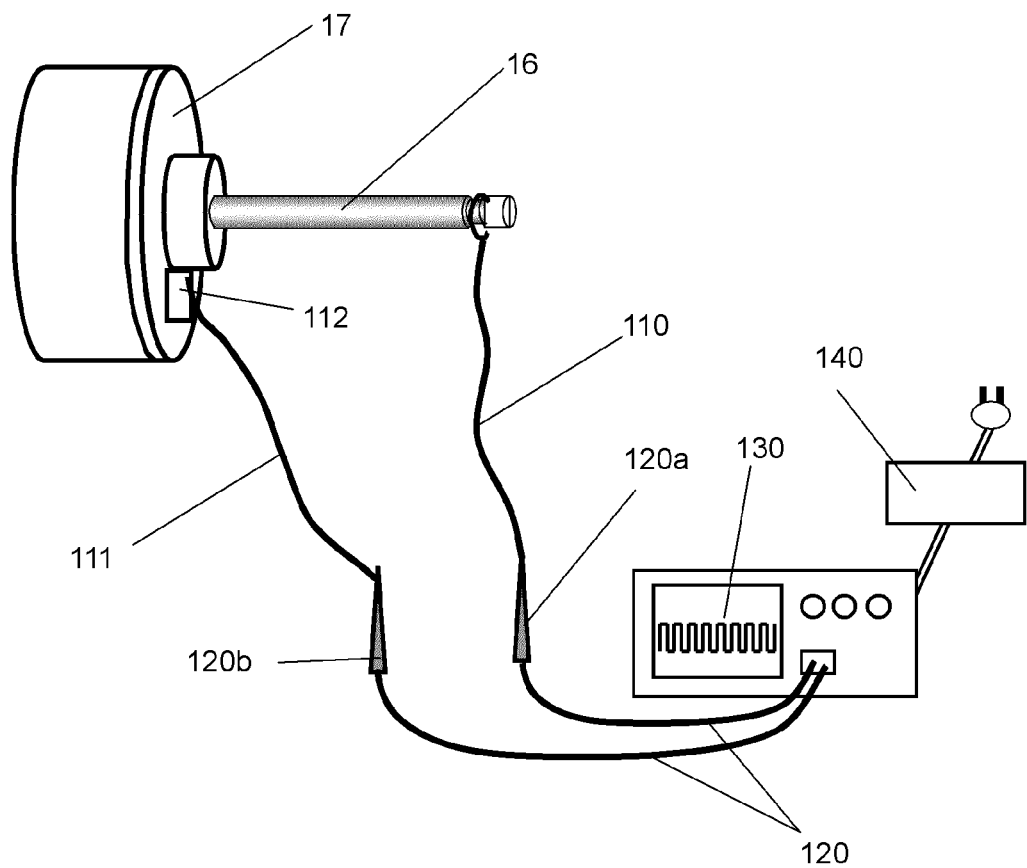
FIG. 7 shows a method of measuring a shaft voltage.

FIG. 7 shows a method of measuring the shaft voltage of each sample. Each sample is integrated into a brushless motor for measuring the shaft voltage, and a stabilized DC power supply is used. The respective shaft voltages are measured under the following condition: power supply voltage Vdc of the windings=391 V, power supply voltage Vcc of the control circuit=15 V, rpm=1000 r/min. The rpm is adjusted with control voltage Vsp, and during the operation the brushless motor is placed with its shaft kept horizontally on a wood plate having a thickness of 20 mm. The shat voltage is measured with digital oscilloscope 130 (Tektronix Model DP07104) and high-voltage differential probe 120 (Tektronix Model P5202) for observing a voltage waveform to measure a peak-to-peak voltage as the shaft voltage. Digital oscilloscope 130 is insulated with isolation transformer 140 as shown in FIG. 7, and high-voltage differential probe 120 is electrically connected to shaft 16 at its (+)side 120a via lead-wire 110 having a length of approx. 30 cm. The conductor of lead-wire 110 is shaped like a loop measuring across approx. 15 mm, and its inner circumference is electrically brought into contact with the outer circumference of shaft 16. High voltage differential probe 120 is electrically connected to bracket 17 at its (−)side 120b via lead-wire 111 having a length of approx. 30 cm. The tip of lead-wire 111 is connected to bracket 17 with conductive tape 112. The voltage between bracket 17 and shaft 16, namely the shaft voltage of bearing 15a at the output shaft side, is measured with the structure discussed above. The voltage waveform is also observed for determining whether or not a waveform collapse occurs.

The waveform collapse of the shaft voltage is classified into three groups, i.e. complete waveform collapse, partial waveform collapse, and no waveform collapse. The no waveform collapse refers to a state where the oil film inside bearing 15 does not encounter an insulation breakdown, so that this state can prevent the electric erosion from occurring. The waveform collapse refers to a state where the oil film inside bearing 15 encounters the insulation breakdown, so that this state may encounter the electric erosion depending on an operation time.

Figure 8:
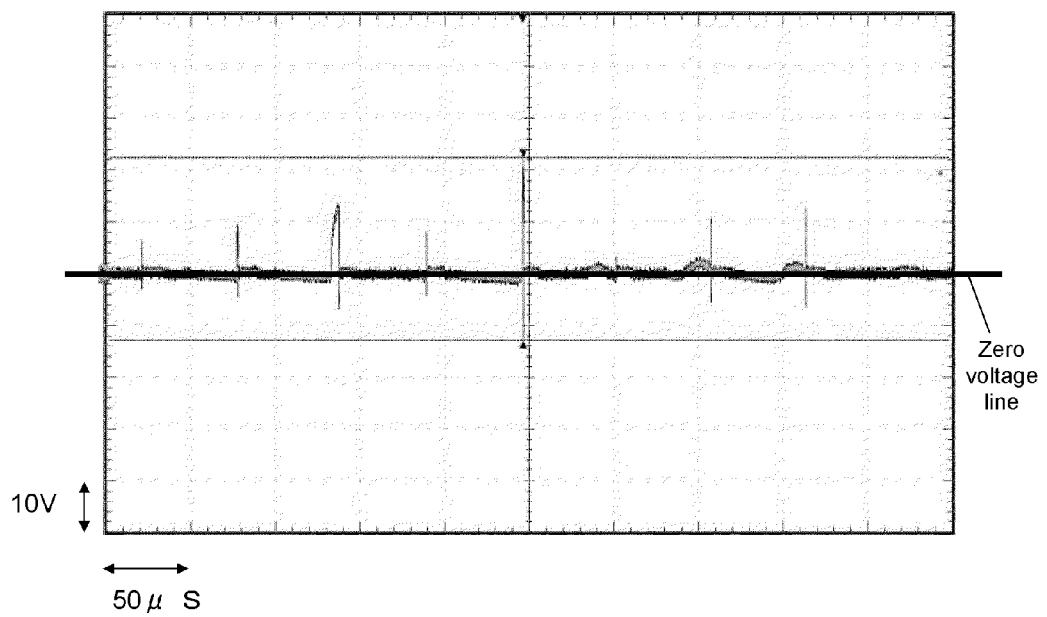
FIG. 8 shows an instance of complete waveform collapse.
Figure 9:
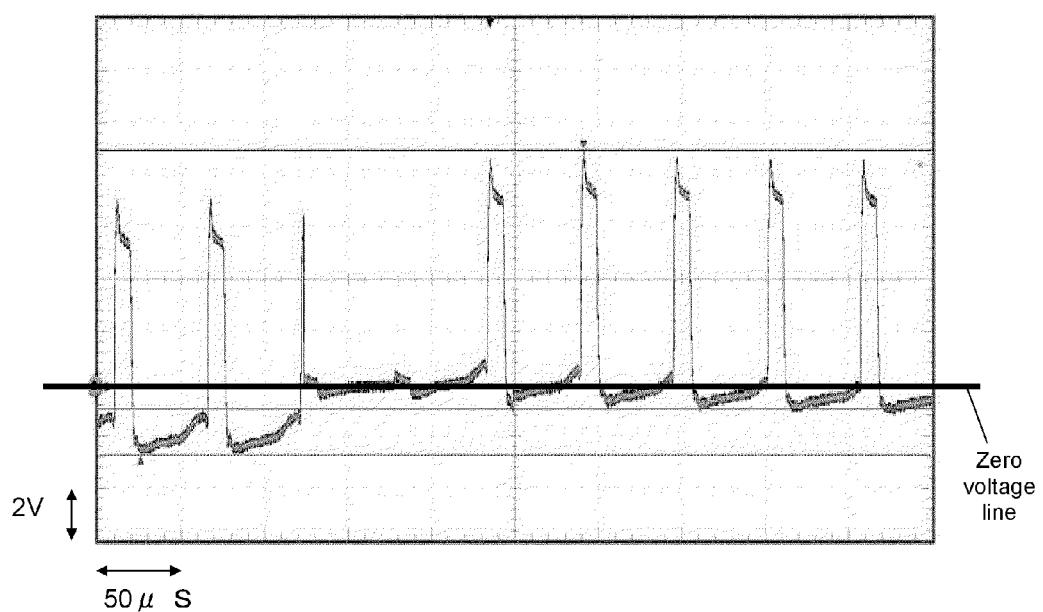
FIG. 9 shows an instance of partial waveform collapse.
Figure 10:
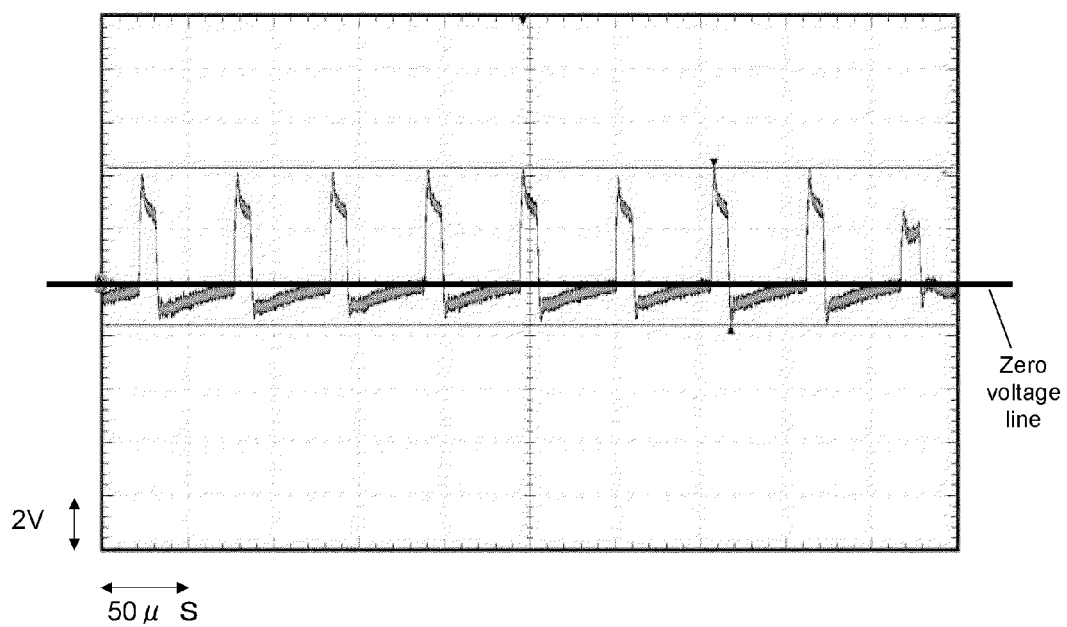
FIG. 10 shows an instance of waveform free from collapse.

FIG. 8-FIG. 10 show examples of the waveforms discussed above. FIG. 8 shows the complete waveform collapse, FIG. 9 shows the partial waveform collapse, and FIG. 10 shows no waveform collapse. The lateral axis of FIG. 8-FIG. 10 represents a time, and the time is measured under the same condition, i.e. 50 µs/div.

The induction voltage is measured this way: The brushless motor with each sample rotor built-in is driven at 1000 r/min by the external driving device, and the induction voltage between the neutral point and phase U is measured. In this case, the same stator 10 is used for the respective rotor samples, so that the rotor sample is replaced with another sample each time.

To confirm whether or not the foregoing specification has the anti-electric erosion effect, the brushless motors having the rotor samples are prepared for testing the durability against the electric erosion.

The endurance test for the electric erosion is done under the following condition: power supply voltage Vdc of the windings=391 V, power supply voltage Vcc of the control circuit=15 V, rpm=1000 r/min (adjusted with control voltage Vsp), the brushless motor disposed with the shaft kept horizontally, and ambient temperature=10° C. The brushless motor is driven for 20,000 hours with no load. The degree of occurrence of the electric erosion before and after the test is checked by comparing the noises before and after the test. Before the test, each sample measures approx. 29 dB.

FIG. 11 shows measuring results of samples 1-9. FIG. 11 lists the column of "waveform collapse of shaft voltage", and the complete waveform collapse as shown in FIG. 8 is indicated by "Complete", the partial waveform collapse as shown in FIG. 9 is indicated by "Partial", and the no waveform collapse as shown in FIG. 10 is indicated by "None" in FIG. 11.

As shown in FIG. 11, rotary-body electrostatic capacity Cr not greater than 50 pF, namely, capacity ratio Re not greater than 1 (one), allows canceling the complete waveform skip. Capacity ratio Rc not greater than 1 (one) also allows lowering the noises after the endurance test to the noise level not greater than 36 dB, which is practically not any more the unpleasant noise level, so that this brushless motor can be used without any problem. Rotary-body electrostatic capacity Cr is thus preferably smaller than bearing electrostatic capacity Cb.

Capacity ratio Rc not greater than 1/5 allows achieving no waveform collapse in the shaft voltage waveform, and also allows lowering the noises after the test to less than 30 dB, which increases little from the noises before the test (29 dB). This instance proves that the capacity ratio not greater than 1/5 is more preferable and suppresses the electric erosion more effectively. In the foregoing description, capacity ratio Rc is adjusted with rotary-body electrostatic capacity Cr; however, an adjustment of a thickness of the oil film can be also used for adjusting capacity ratio Rc.

Capacity ratio Rc less than 1/50 allows lowering substantially the induction voltage as shown in FIG. 11, because in order to adjust rotary-body electrostatic capacity Cr at 0.5 pF, rotary body 30 should be formed of only ferrite resin magnet 32 and dielectric layer 50, and rotor iron core 31 supposed to work as a back yoke cannot be used. To maintain the motor characteristics represented typically by efficiency, it is preferable to achieve rotary-body electrostatic capacity Cr not smaller than 1 pF, namely, capacity ratio Rc not smaller than 1/50.

From a standpoint of suppressing the electric erosion and a standpoint of maintaining the motor characteristics, capacity ratio Rc preferably falls within the range from 1/50 to 1/5 (inclusive).

Figure 12:
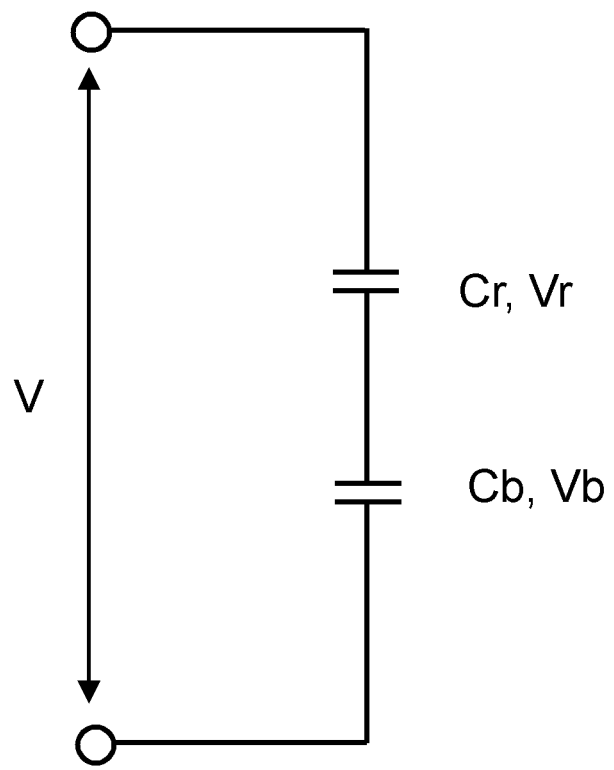
FIG. 12 shows an equivalent circuit to electrostatic capacity Cr of the rotary body and electrostatic capacity Cb of the bearing.

FIG. 12 shows an equivalent circuit to rotary-body electrostatic capacity Cr and bearing electrostatic capacity Cb, FIG. 12 also shows shaft voltage Vb when common mode voltage is V. Based on FIG. 12, it can be calculated that a smaller rotary-body electrostatic capacity Cr makes shaft voltage Vb smaller. This is a similar trend to the results shown in FIG. 11.

Those results prove that the motor of the present invention has a lower shaft voltage, which advantageously suppresses the occurrence of the electric erosion in the bearing. To integrate this motor into an electric device allows the electric device to suppress the occurrence of the electric erosion in the bearing.

In the foregoing description, the inner-rotor type motor, i.e. the rotor is rotatably disposed inside the stator, is taken as an example; however, the present invention is applicable to an outer-rotor type motor, i.e. the rotor is disposed outside the stator.

Figure 13:
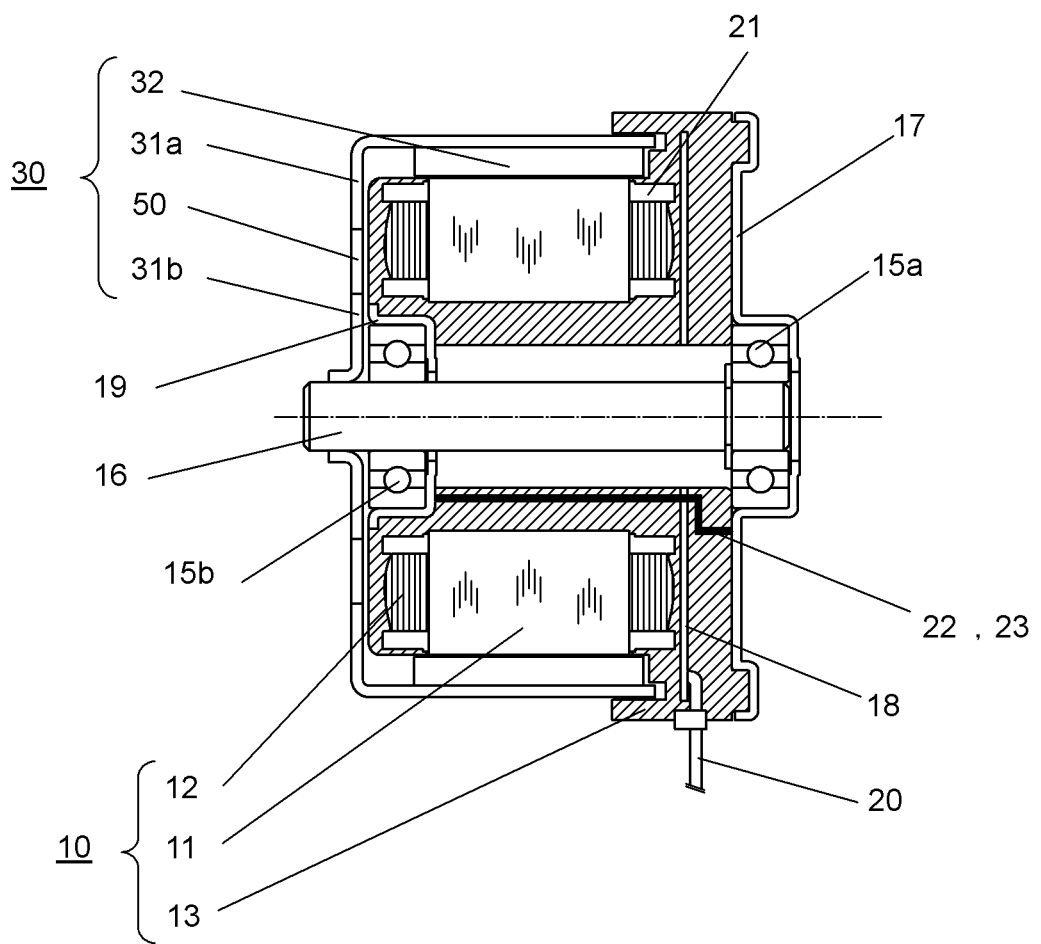
FIG. 13 is a sectional view of an outer-rotor type motor as another structure in accordance with the first embodiment of the present invention.

FIG. 13 is a sectional view illustrating a structure of an outer-rotor type motor that is cited as another instance in accordance with this embodiment. In FIG. 13, structural elements similar to those used in FIG. 1 have the same reference marks. As shown in FIG. 13, stator iron core 11 is wound with stator windings 12 and is molded with insulating resin 13, whereby stator 10 is formed. Brackets 17 and 19 are integrally molded together with stator 10. Bearing 15a is fixed to bracket 17, and bearing 15b is fixed to bracket 19. Shaft 16 extends through each of inner rings of bearings 15a and 15b, and a first end of shaft 16 is joined to rotary body 30 shaped like a hollow cylinder. Stator iron core 11 is disposed in the inside hollow section of rotary body 30. In rotary body 30, annular dielectric layer 50 is disposed such that layer 50 is sandwiched between outer iron core 31a and inner iron core 31b. Each outer ring of bearings 15a and 15b is electrically connected to each other via conduction pin 22, and yet, the respective outer rings are insulated from stator iron core 11. The foregoing outer-rotor type motor includes dielectric layer 50 as shown in FIG. 13 and similar to the structure shown in FIG. 1, and on top of that, bracket 17 is electrically connected to bracket 19, so that a similar advantage to what is discussed in FIG. 1 is obtainable.

In the foregoing discussion dielectric layer 50 is prepared, and the relative dielectric constant of the materials of layer 50 as well as the thickness of resin is adjusted, whereby capacity ratio Rc is determined; however, the wt % of resin component of ferrite resin magnet 32 can be adjusted for determining capacity ratio Rc. In a case of employing a bonded magnet, a volume quantity of the resin component can be increased, or a material of low dielectric constant, e.g. syndiotactic polystylene, can be employed. On top of that, joint 51 shown in FIG. 2 is provided with an insulating layer made of, e.g. resin, for fixing the shaft to the rotor iron core as well as for insulating them from each other so that a desirable rotary-body electrostatic capacity Cr can be obtained. The structure is thus not limited to the one where dielectric layer 50 is prepared.

In the foregoing discussion, the rotor having the ferrite resin magnet of SPM (surface permanent magnet) type is used; however, use of a ferrite sintered magnet or use of a rare-earth neodymium-based sintered magnet generates a similar advantage to what is discussed previously. Use of a rotor having an interior permanent magnet also generates a similar advantage.

An electrostatic capacity is preferably measured with a frequency approximate to a driving frequency of PWM method. In recent years, a driving frequency generally used in the inverter of PWM method for driving a motor is 10 kHz, so that the measuring frequency is preferably approximate to this 10 kHz, e.g. within the range from 5 kHz to 20 kHz. In this embodiment, a measuring frequency of 10 kHz is used as it is used in the condition discussed previously. The electrostatic capacity of the bearing is preferably measured at the rpm of 1000 r/min because many of household motors rotate at 1000 r/min. The present invention, however, is not limited to the measuring frequency of 10 kHz or rpm of 1000 r/min.

Embodiment 2

An electric device of the present invention is, e.g. an indoor unit of an air-conditioner. A structure of the indoor unit is detailed in this second embodiment.

Figure 14:
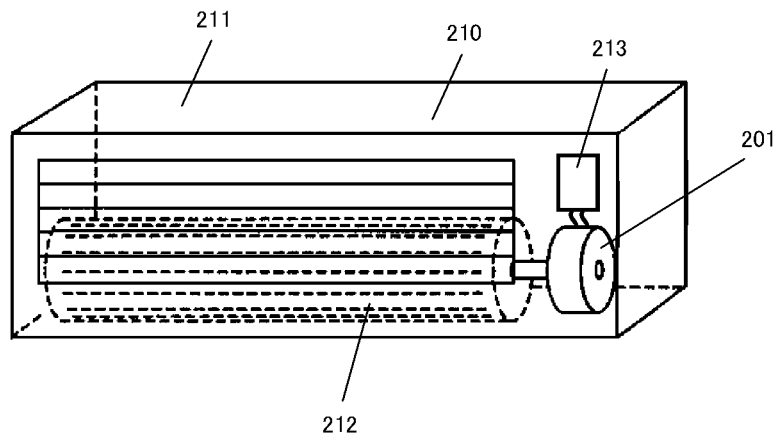
FIG. 14 shows a structure of an electric device (indoor unit of air-conditioner) in accordance with a second embodiment of the present invention.

In FIG. 14, motor 201 is mounted in housing 211 of indoor unit 210 of the air-conditioner. Cross-flow fan 212 is mounted on a rotary shaft of motor 201, which is driven by motor driver 213. Motor driver 213 feeds motor 201 with power, thereby driving motor 201, and cross-flow fan 212 starts rotating. The rotation of cross-flow fan 212 blows air, which is conditioned by a heat exchanger (not shown) disposed in the indoor unit, into a room. Motor 201 employs, e.g. the motor in accordance with the first embodiment discussed previously. The electric device of the present invention includes a motor and a housing that accommodates the motor, and this motor is in accordance with the present invention.

Embodiment 3

Figure 15:
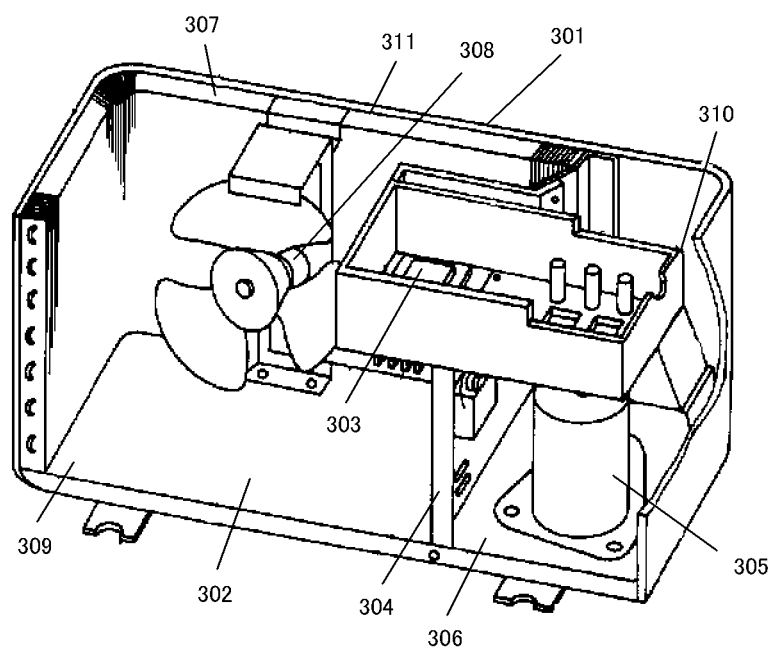
FIG. 15 shows a structure of an electric device (outdoor unit of air-conditioner) in accordance with a third embodiment of the present invention.

An electric device of the present invention is, e.g. an outdoor unit of an air-conditioner. A structure of the outdoor unit is detailed in this third embodiment. In FIG. 15 motor 308 is mounted in housing 311 of outdoor unit 301 of the air-conditioner. Fan 312 is mounted on a rotary shaft of motor 308, which works as a blower motor.

Outdoor unit 301 is divided by partition 304, disposed on bottom plate 302 of housing 311, into compressor room 306 and heat exchanger room 309. Room 306 accommodates compressor 305, and room 309 accommodates heat exchanger 307 and the foregoing blower motor. Electric accessories are placed in box 310 disposed above partition 304.

Motor driver 303 disposed in box 310 drives motor 308, and fan 312 starts rotating, so that the blower motor blows air to heat exchanger room 309 through heat exchanger 307. Motor 308 employs, e.g. the motor in accordance with the first embodiment. The electric device of the preset invention includes a motor and a housing that accommodates the motor, and this motor is in accordance with the present invention.

Embodiment 4

Figure 16:
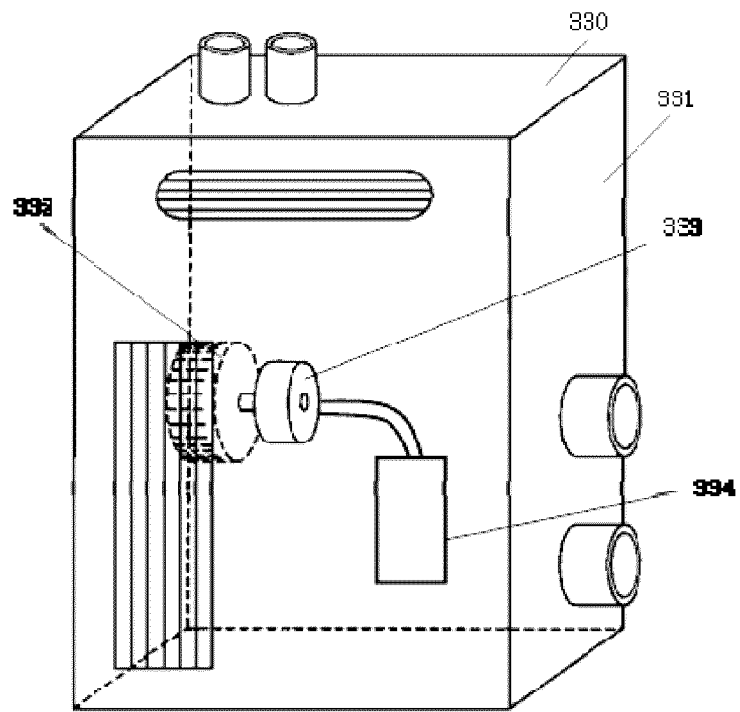
FIG. 16 shows a structure of an electric device (hot water supply) in accordance with a fourth embodiment of the present invention.

An electric device of the present invention is, e.g. a hot water supply. A structure of the hot water supply is detailed in this fourth embodiment. In FIG. 16, motor 333 is mounted in housing 331 of hot water supply 330. Fan 332 is mounted on a rotary shaft of motor 333, which is driven by motor driver 334. Motor driver 334 feeds motor 333 with power, thereby rotating motor 333, and fan 332 starts rotating. The rotation of fan 332 allows blowing air, necessary for combustion, into a fuel vaporizing room (not shown). Motor 333 employs, e.g. the motor in accordance with the first embodiment. The electric device of the present invention includes a motor and a housing accommodating the motor. This motor is in accordance with the present invention.

Embodiment 5

Figure 17:
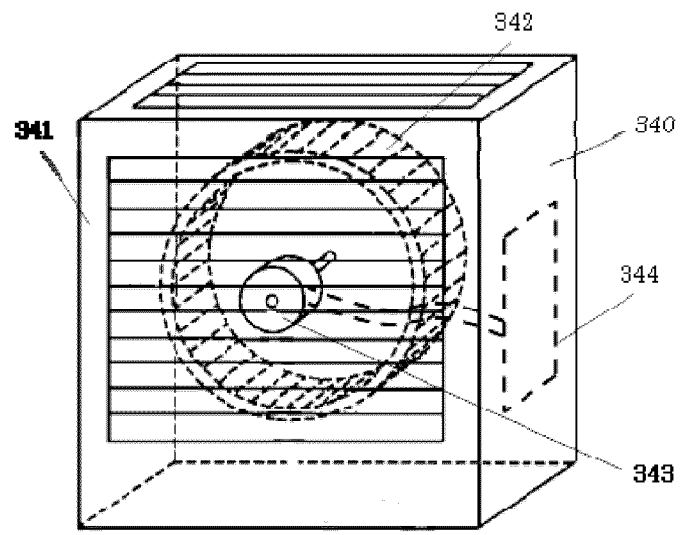
FIG. 17 shows a structure of an electric device (air cleaner) in accordance with a fifth embodiment of the present invention.

An electric device of the present invention is, e.g. an air cleaner. A structure of the air cleaner is detailed in this fifth embodiment. In FIG. 17 motor 343 is mounted in housing 341 of air cleaner 340. Fan 342 is mounted on a rotary shaft of motor 343, which is driven by motor driver 344. Motor driver 344 feeds motor 343 with power, thereby rotating motor 343, and fan 342 starts rotating. The rotation of fan 342 allows circulating air. Motor 343 employs, e.g. the motor in accordance with the first embodiment discussed previously. The electric device of the present invention includes a motor and a housing that accommodates the motor. This motor is in accordance with the present invention.

The descriptions discussed previously refer to the outdoor unit and the indoor unit of an air-conditioner, the hot water supply, and the air cleaner as examples of the electric devices of the present invention; however, not to mention, the present invention is applicable to other motors mounted to a variety of information devices, or motors used in a variety of industrial machines.

The embodiments of the present invention employ, as discussed previously, the structure in which the power supply circuit of the driving circuit (including the control circuits and others), which prompts the inverter to drive the motor with the PWM method, is electrically insulated from the primary side circuit of the power supply circuit, and from the grounding to earth on the primary side circuit. This structure allows eliminating a conventional structure, i.e. a stator iron core of a motor is electrically grounded to the earth, and yet, the structure of the present invention allows achieving advantageously a suppression of the electric erosion in the bearing.

Industrial Applicability

The motor of the present invention allows lowering the shaft voltage, so that it is suitable for suppressing the occurrence of electric erosion in the bearing. The present invention is applicable to the motors mounted in electric devices that require the motor to be inexpensive and to have a longer service life. The devices include, for instance, an indoor unit and an outdoor unit of air-conditioner, a hot water supply, and an air cleaner.

The invention claimed is:

1. A motor comprising:
   a stator including a stator iron core wound with a stator winding;
   a rotor disposed for rotation with a shaft, the rotor including a rotary body whose outer most wall holds a permanent magnet, and the shaft extending through the center of the rotary body and being secured to the rotary body;
   a dielectric layer disposed in the rotary body around the shaft to decrease a rotary-body electrostatic capacity between the shaft and the outermost of wall of the rotary body;
   a bearing having an inner ring and an outer ring for rotatably supporting the shaft, wherein the bearing has a bearing electrostatic capacity measurable during rotation of the bearing between the inner ring and the outer ring thereof; and
   a conductive bracket for fixing the bearing,
   wherein the dielectric layer is made of a dielectric material so selected and sized that the rotary-body electrostatic capacity is equal to or smaller than one fifth ($1/5$) of the bearing electrostatic capacity.

2. The motor of claim 1, wherein a relation of $1/50 \leq Cr/Cb \leq 1/5$ is established, where Cb represents the bearing electrostatic capacity, and Cr represents the rotary-body electrostatic capacity.

3. The motor of claim 1, wherein the rotary-body electrostatic capacity falls within a range from not smaller than 1 pF to not greater than 50pF.

4. The motor of claim 1 comprising two conductive brackets including the bracket and comprising two sets of bearings including the bearing, wherein the two sets of bearings are fixed, respectively, to the two brackets, and the two brackets are connected to each other electrically, while the two brackets are insulated from the stator iron core.

5. The motor of claim 4, wherein at least one of the two brackets and the stator iron core are molded together with an insulating resin.

6. The motor of claim 1, wherein the rotor is disposed rotatably inside the stator.

7. An electric device employing the motor as defined in claim 1.

8. An electric device employing the motor as defined in claim 2.

9. An electric device employing the motor as defined in claim 3.

10. An electric device employing the motor as defined in claim 4.

11. An electric device employing the motor as defined in claim 5.

12. An electric device employing the motor as defined in claim 6.

* * * * *